US011211869B2

(12) United States Patent
Banaska et al.

(10) Patent No.: US 11,211,869 B2
(45) Date of Patent: Dec. 28, 2021

(54) LLC POWER SUPPLY CURRENT-SHARING AND FREQUENCY LOCKING MECHANISM

(71) Applicant: NATIONAL INSTRUMENTS CORPORATION, Austin, TX (US)

(72) Inventors: John G. Banaska, Spicewood, TX (US); Chin-Hong Cheah, Pulau Pinang (MY)

(73) Assignee: National Instruments Corporation, Austin, TX (US)

(*) Notice: Subject to any disclaimer, the term of this patent is extended or adjusted under 35 U.S.C. 154(b) by 608 days.

(21) Appl. No.: 15/923,438

(22) Filed: Mar. 16, 2018

(65) Prior Publication Data

US 2018/0269772 A1    Sep. 20, 2018

Related U.S. Application Data

(60) Provisional application No. 62/472,701, filed on Mar. 17, 2017.

(51) Int. Cl.
| | |
|---|---|
| *H02J 1/00* | (2006.01) |
| *H02J 3/00* | (2006.01) |
| *H02M 3/28* | (2006.01) |
| *H02M 1/00* | (2006.01) |
| *H02J 1/10* | (2006.01) |
| *H02M 3/335* | (2006.01) |

(52) U.S. Cl.
CPC ............ *H02M 3/285* (2013.01); *H02J 1/102* (2013.01); *H02M 1/00* (2013.01); *H02M 1/0003* (2021.05); *H02M 1/0058* (2021.05); *H02M 3/33507* (2013.01); *Y02B 70/10* (2013.01)

(58) Field of Classification Search
CPC .................. H02M 1/00; H02M 3/285; H02M 2001/0058; H02M 2001/0003; H02M 3/33507; H02M 1/0003; Y02B 70/1491; H02J 1/10; H02J 1/102
See application file for complete search history.

(56) References Cited

U.S. PATENT DOCUMENTS

| | | |
|---|---|---|
| 5,724,237 A | 3/1998 | Hunter |
| 6,118,680 A | 9/2000 | Wallace et al. |
| 6,141,231 A | 10/2000 | Brkovic |
| (Continued) | | |

*Primary Examiner* — Hal Kaplan
*Assistant Examiner* — Rasem Mourad
(74) *Attorney, Agent, or Firm* — Kowert, Hood, Munyon, Rankin & Goetzel P.C.; Jeffrey C. Hood

(57) ABSTRACT

A multiphase current-sharing configuration may include at least two power supplies providing respective output-currents in the current-sharing configuration. One or more of the power supplies may itself be a multiphase power supply. A first power supply of the current-sharing configuration may detect a phase difference between an external control signal provided to the first power supply to control the output voltage of the first power supply, and an internal control signal provided by a VCO of the first power supply. The phase difference may be provided to an integrator to cause the internal control signal to track the external control signal when the external control signal is available, and maintain a present operating frequency of the internal control signal in case the external control signal is lost, in which case the internal control signal may be used to uninterruptedly control the output voltage of the first power supply.

20 Claims, 9 Drawing Sheets

(56) References Cited

U.S. PATENT DOCUMENTS

| | | | |
|---|---|---|---|
| 6,160,725 A * | 12/2000 | Jansen | H02J 1/102 363/65 |
| 7,541,793 B2 | 6/2009 | Saeueng et al. | |
| 7,939,967 B2 | 5/2011 | Humphrey et al. | |
| 8,120,204 B2 | 2/2012 | Moon et al. | |
| 8,891,255 B2 | 11/2014 | Uno | |
| 9,525,334 B2 | 12/2016 | Chen | |
| 9,621,070 B2 | 4/2017 | Barbosa et al. | |
| 2003/0214274 A1 | 11/2003 | Lethellier | |
| 2011/0280299 A1 * | 11/2011 | O'Malley | H03K 7/08 375/238 |

* cited by examiner

LLC POWER SUPPLY CURRENT-SHARING AND FREQUENCY LOCKING MECHANISM

PRIORITY CLAIM

This application claims benefit of priority of U.S. Provisional Patent Application Ser. No. 62/472,701 titled "LLC Power Supply Current Sharing and Frequency Locking Mechanism", filed on Mar. 17, 2017, which is hereby incorporated by reference as though fully and completely set forth herein.

FIELD OF THE INVENTION

The present invention relates to the field of instrumentation, and more particularly to the design of an LLC power supply current-sharing and frequency locking mechanism.

DESCRIPTION OF THE RELATED ART

A switched-mode power supply (also referred to as a switching-mode power supply, switch-mode power supply, switched power supply, or switching power supply) is an electronic power supply that incorporates a switching regulator to efficiently convert electrical power. Unlike a linear power supply, the pass transistor of a switching power supply continually switches between low-dissipation, full-on and full-off states, remaining in high dissipation transition states for only brief periods of time, thereby reducing wasted energy. Voltage regulation is typically achieved by varying the ratio of the on-state and off-state of the pass transistor(s). In contrast, a linear power supply regulates the output voltage by continually dissipating power in the pass transistor. The higher power conversion efficiency is therefore an important advantage of a switching power supply, which may also be substantially smaller and lighter than a linear power supply due to the smaller transformer size and weight.

During the development of square-wave switching power conversion (e.g. pulse width modulated—PWM—switching), concerns regarding suddenly turning OFF current passing through an inductor lead to the design of "resonant topologies". Switching power supplies featuring one such topology are referred to as LLC power supplies. The LLC topology features a unique combination of two inductors and one capacitor (hence the name, "LLC"), and offers a relatively narrow range of switching frequencies, which make possible the design of standard EMI filters combined with the capability of producing zero-voltage switching (soft-switching) through careful design, significantly improving electromagnetic interference (EMI) and efficiency over a wide load range.

Because LLC converters are part of the resonant converter family, voltage regulation is not performed in the exact same manner as it is in conventional PWM switching power converters. Running at 50% duty-cycle and fixed 180 degree phase shift, regulation is typically obtained through frequency modulation. All primary side switches turn on resonantly—zero voltage switching—resulting in full recycling of the energy contained in the MOSFETs' parasitic output capacitance. Furthermore, all secondary side switches turn off resonantly—zero current switching—to minimize switching losses normally associated with hard switching. Resonant operation of all switching devices in the LLC converter results in minimized dynamic loss, and thus increased overall efficiency, particularly at higher operating frequencies in the hundreds of kHz to MHz range.

LLC Converters are becoming widely accepted in offline (AC-DC) power supplies due to their high efficiency and lower component count. Adoption has been limited, however, to moderate power levels (e.g. lower than 400 W). At higher power levels, traditional approaches make use of multiphase techniques to divide component stress and reduce the size of the components. In addition, multiphase arrangements can reduce ripple currents on output filters/capacitors, greatly extending the life of these components. This is especially important in high output-current supplies. LLC converters operate on a variable frequency control scheme to regulate line and load variation, using the slope of the gain/frequency curve to adjust the gain.

Combining the outputs of several (more than one) LLC stages allows sharing the load current. Generally, two or more (LLC) power supplies (or LLC stages) are coupled in parallel to increase the power output and achieve parallel redundancy, that is, continued operation even if one of the power supplies (or power supply stages) fails. When two or more power supplies are combined in parallel for sharing the load current, it is important to ensure that the respective outputs of the power supplies provide an equal share of the total output power during normal operation. In order to achieve successful parallel redundancy, it is also important to ensure that when one of the power supplies is hot-unplugged (that is, it is unplugged while the sharing configuration is operating) or fails, or a new power supply is hot-plugged into the system (that is, plugged into the system when the system is in operation), the power output remains uninterrupted and within operational specifications.

Other corresponding issues related to the prior art will become apparent to one skilled in the art after comparing such prior art with the present invention as described herein.

SUMMARY OF THE INVENTION

Various embodiments of systems disclosed herein include a novel frequency controlled topology for parallel LLC current-sharing power supply system.

A multiphase current-sharing configuration may include at least two power supplies (e.g. two LLC power supplies or LLC power supply stages, or LLC stages for short) providing respective output-currents in the current-sharing configuration. A first power supply in the current-share configuration may be operated as a slave power supply to a second power supply operated as a master power supply in the current-share configuration. The slave power supply may be driven by a master voltage-controlled oscillator (VCO) signal provided to the slave power supply by the master power supply. In order to maintain seamless operation even when the master power supply fails to provide the master VCO signal to the slave power supply for any reason, the slave power supply may continually monitor the VCO output of the master power supply and take preventive measures in case the VCO output of the master power supply (also referred to as master VCO signal) is lost or drops out for any reason.

Accordingly, the slave power supply may detect a phase difference between the master VCO signal and the internal VCO signal (also referred to as slave VCO signal) generated via an internal control loop of the slave power supply. A signal representative of the phase difference may be provided to an integrator in the slave power supply, and the integrator may cause the internal VCO signal to track the master VCO signal while the master power supply is operating normally. That is, the internal VCO signal may be effectively maintained as a "replica" of the external VCO signal while the master power supply is operating normally. The integrator in the slave power supply may accordingly maintain a present operating frequency of the internal VCO signal when the master VCO output signal (the external VCO signal) is lost for any reason, when switching over to operating as a standalone power supply. Therefore, the slave power supply may continue operating as a standalone power supply even while the master power supply isn't providing the master VCO signal to the slave power supply, and once the master VCO signal is again available, the slave power supply may continue to operate seamlessly in slave mode, simply continuing tracking the master VCO signal.

Pursuant to the above, in some embodiments, a method for controlling a power supply may include providing, by a first power supply, a first output-current determined at least in part by an output voltage of the first power supply, generating, by the first power supply, an internal control signal based at least on an external control signal provided to the first power supply from an external source, and regulating the output voltage of the first power supply using the external control signal. The method may further include maintaining the internal control signal independent of (or independently from) the external control signal and regulating the output voltage of the first power supply using the internal control signal in response to the external control signal being lost. Generation of the internal control signal may include detecting a phase difference between the external control signal and the internal control signal, and using the phase difference to cause the operating frequency of the internal control signal to match the operating frequency of the external control signal.

In some embodiments, a power supply may include a switching output stage that provides an output voltage to source a first output-current. The power supply may further include a control circuit coupled to the switching stage to generate an internal control signal based at least on an external control signal received from an external source, and regulate the output voltage using the external control signal. In the event the external control signal is lost, the control circuit may maintain the internal control signal independent of (or independently from) the external control signal, e.g. based on the output voltage, and may regulate the output voltage using the internal control signal. The external source may be a second power supply that provides a second output-current, with the first output-current and the second output-current representing respective portions of a total output-current provided by a current sharing configuration that includes the first power supply and the second power supply. The control circuit may then also receive a second external control signal from the second power supply, and achieve balanced output-current sharing between the first power supply and the second power supply, using the external control signal. Furthermore, the power supply may itself be a multiphase power supply, with the first output-current having two or more portion currents, and the control circuit balancing the first output-current to have the two or more portion currents represent equal portions of the first output-current.

In some embodiments, the control circuit may include a VCO having an output that provides the internal control signal, and may also include a first integrator having a first input, a second input, and an output, with the first input driven by a value representative of the output voltage, and the output drive an input of the voltage-controlled oscillator. The control circuit may further include a phase detector to detect a phase difference between the external control signal and the internal control signal, and may finally include a second integrator to drive the second input of the first integrator according to the phase difference to cause the operating frequency of the internal control signal to match the operating frequency of the external control signal.

Finally, a current-sharing configuration may include a first power supply operating as a master power supply and generating a first control signal to control a first output voltage provided by the first power supply to source a first portion of a total current provided by the current sharing configuration. The current-sharing configuration may also include a second power supply that provides a second output voltage to source a second portion of the total current. The second power supply may receive the first control signal from the first power supply, generate a second control signal based at least on the first control signal, and regulate the second output voltage using the first control signal. In the event the second power supply stops receiving the first control signal from the first power supply, the second power supply may maintain the second control signal independently from (or independent of) the first control signal and regulate the second output voltage using the second control signal. In order to generate the second control signal, the second power supply may detect a phase difference between the first control signal and the second control signal, and use the phase difference to cause the operating frequency of the second control signal to match the operating frequency of the first control signal.

In some embodiments, the second power supply may detect whether the first control signal is present, regulate the second output voltage using the first control signal in response to detecting that the first control signal is present, and generate the second control signal based on the second output voltage signal and regulate the second output voltage using the second control signal in response to detecting that the first control signal is not present. Furthermore, the first power supply may provide a third control signal to the second power supply, which the second power supply may use to achieve balanced output-current sharing between the first power supply and the second power supply.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
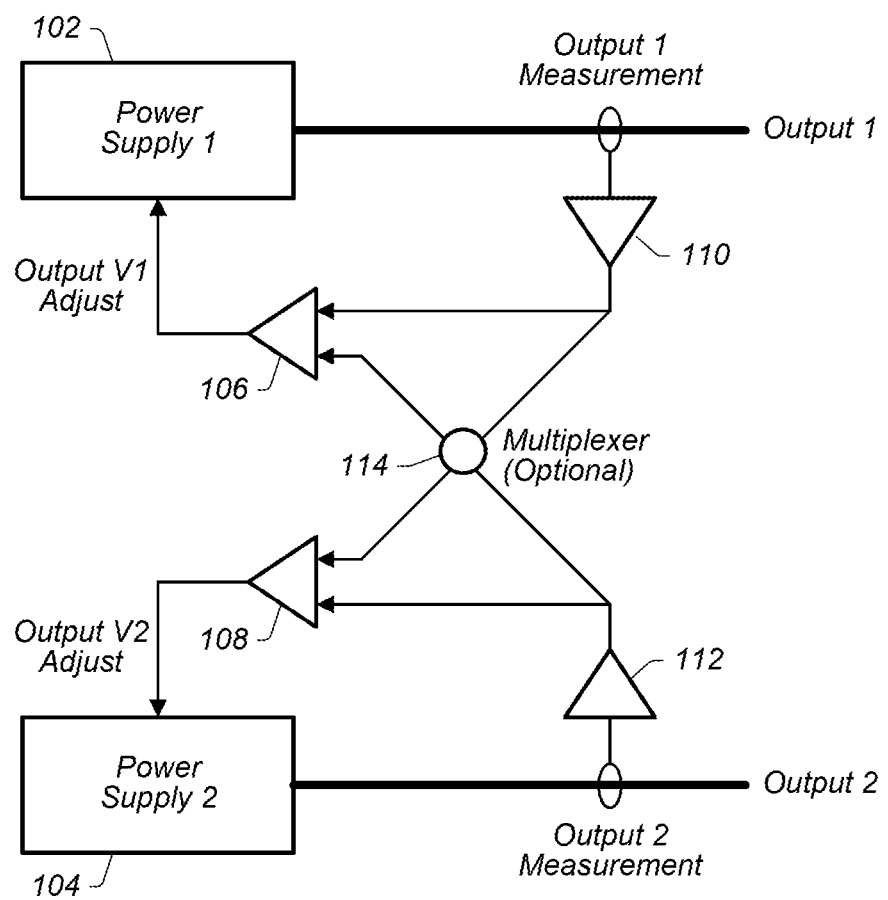
FIG. 1 shows an exemplary circuit diagram of two power supplies operating in parallel in a current-sharing configuration, according to prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

According to various embodiments, a power-sharing configuration may include multiple power supplies coupled in parallel to provide increased power output and continued operation even if one or more of the power supplies fails, so long as at least one power supply remains operational. In some embodiments, the current-sharing configuration may include LLC power supply stages operating in a master-slave configuration in which the slave power supplies may be operated according to a novel frequency-locking mechanism preventing an operating failure of the power-sharing configuration even in case the master power supply fails, e.g. when the master device stops operating or functioning correctly.

As mentioned above, two or more power supplies, or power stages, are typically connected/coupled/configured in parallel for at least increased power output and parallel redundancy—that is, continued operation if one (or more) of the power supplies, or power stages, fails, as long as at least some of the power supplies or power stages remain operational. In both cases, it is important to have mechanisms in place that ensure that the respective outputs of both power supplies provide a current that corresponds to an equal share of the total power provided by the power supply combination/current-share configuration during normal operation. For redundancy, it is important to ensure that when one of the power supplies fails or is hot-unplugged, or if a new power supply is hot-plugged into the system, the power output of the power supply system (or current-share configuration or power-share configuration) remains uninterrupted and within operational specifications. It should be noted that "hot-plugged" and "hot-unplugged" are used herein to denote coupling or uncoupling a power stage (or power supply) to or from the current-share configuration (or power-share configuration or power system), respectively, while the current-sharing configuration is operating, i.e. it is not turned off.

Although there are existing solutions to these issues, various novel methods and systems disclosed herein provide solutions for at least an LLC Power Supply and frequency controlled topology, yielding at least the following advantages:

Frequency locking of paralleled (or parallel) power supplies—improved noise and life performance of power supplies as multiple (N) units are paralleled together;

Inherent balanced current-sharing which does not require precise calibration or obtaining current measurements within each power supply; and Active and unsaturated frequency control loop connectivity within the slave power supply, which allows the slave power supply to take over the frequency control loop when the master power supply is removed.

Present Power-Sharing Configurations

In most present day systems, when two or more power supplies or power supply stages (e.g. LLC stages) are operated in parallel to provide a total combined output-current, that total output-current is typically expected to be shared equally amongst the power supplies (or power stages) to ensure that no one power supply (power stage) is loaded more than others. In most present implementations, for example in the system illustrated in FIG. 1, each power supply, specifically power supply 102 and power supply 104, measures its own current output and transmits this information to the other power supply via either balanced or unbalanced lines, by analog or digital means, in a multiplexed or non-multiplexed fashion. As illustrated in FIG. 1, the output of power supply 102 is measured through sense element 110, and in a similar manner, the output of power supply 104 is measured through sense element 112. The respective measurements, or information/data corresponding to the respective measurements are provided through optional multiplexer 114 to comparator circuits 106 and 108, respectively, from which they are fed back to power supply 102 and power supply 104, respectively, to control Output 1 and Output 2. Each power supply compares the output-current information received from the other power supply to its own output-current information, and adjustments are made via an analog or digital feedback loop—from comparator 106 to power supply 102, and from comparator 108 to power supply 104—to balance the current-output of the power supply with respect to the current-output of the other power supply. It should be noted that for the sake of simplicity, only two power-supplies are illustrated, by one of ordinary skill in the art will appreciate that various current-sharing configurations or power-sharing configurations may include more than two power supplies or power stages operating in a manner similar as that described with respect to FIG. 1.

Improved Power-Sharing Configuration

From the above description it is evident that while balance is achieved, only static current information is transmitted between the power supplies 102 and 104. As it is common today, power supply 1 and power supply 2—as depicted in FIG. 1—are most likely switch-mode, or switching power supplies. When switching power supplies are configured in parallel, the respective switching frequencies of the power supplies may be synchronized, perhaps in antiphase with respect to each other, to cancel output ripples, thereby reducing the output ripple noise of the power supply. In case of synchronized power supplies, the input noise current may also be reduced as they also benefit from ripple cancellation. When two power supplies are operating at respective frequencies that are very close to each other in value (e.g. the switching frequency of the first power supply is within a specified range of values of the switching frequency of the second power supply), and the power supplies are operated in parallel, e.g. in a power-sharing configuration, a phenomenon referred to as "beating" occur, resulting from slight errors as well as the asynchronous operation of the power supplies.

This is especially important in LLC power supplies in which the power supply outputs are controlled directly by the present operating frequency. In some embodiments, for example when LLC power supplies (or LLC stages) are operating in parallel, two novel mechanisms may be implemented for better operation:

The operating frequency and phase of each power supply may be locked with respect to the other power supply (or with respect to each other power supply in the current-share configuration); and A mechanism where the 'slave' power supply, which is operated from (or based on) the voltage-controlled oscillator (VCO) of the master power supply, maintains its tracking operation and linearity such that when the master power supply fails or is turned off, delays in reestablishing the master power supply's control of the output voltage are minimized.

Figure 2:
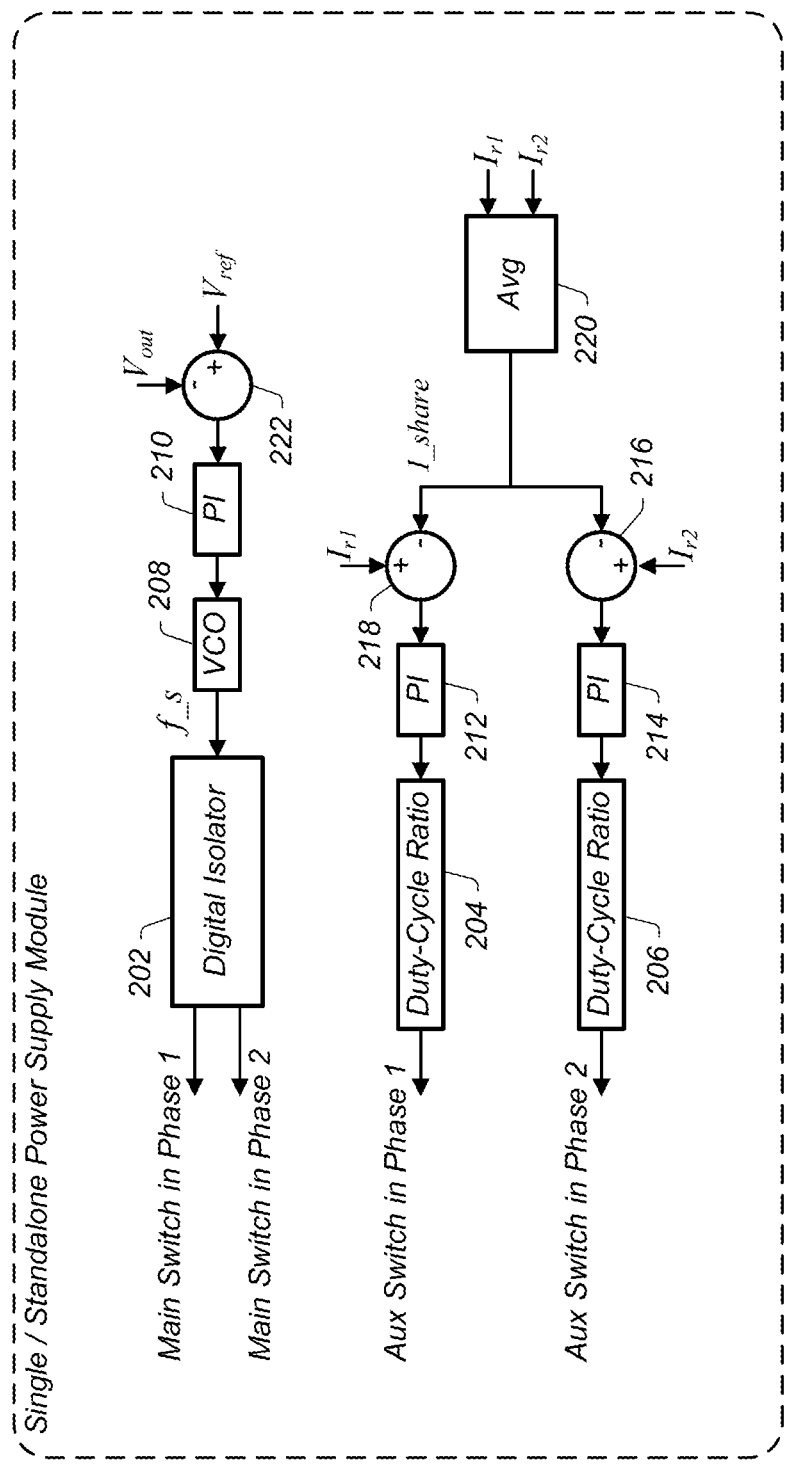
FIG. 2 shows an exemplary system diagram illustrating the operation of a single 2-phase LLC power supply operating independently, according to some embodiments.

FIG. 2 shows an exemplary partial system diagram illustrating the control operation of a single 2-phase LLC power supply operating independently, according to some embodiments. The single 2-phase power supply shown in FIG. 2 may be thought of as representing a current-sharing configuration with two LLC stages providing a first output (Phase 1) current for a first portion of a total current and a second output (Phase 2) current for a second portion of the total current. The multiphase LLC supply exemplified in FIG. 2 uses a variable-duty-cycle controlled switch for each phase in order to adjust the resonant gain to balance the phase current. As shown in FIG. 2, a mechanism is implemented to balance the total current between Phase 1 and Phase 2 of the LLC power supply, whereby the Phase 1 and Phase 2 currents are of equal value (or close to equal value within a specified tolerance, for example the two current values may not differ from each other by more than a specified variance).

FIG. 2 shows the control loops used in operating the LLC power supply, with a first control loop for controlling the output voltage and a second control loop for balancing the current between Phase 1 and Phase 2. The first control loop includes a comparator 222, a proportional-integral (PI) controller 210, a voltage-controlled oscillator (VCO) 208, and a digital isolator 202, which provides the main switching signals to the output power stages (not shown). The second control loop includes an averaging circuit 220 which determines the balanced shared current value, comparators 216 and 218, PI controllers 212 and 214, and duty-cycle ratio control circuits 204 and 206. The output voltage $V_{out}$ of the LLC power supply is measured and compared to an internal reference voltage $V_{ref}$ at comparator 222, and the voltage-controlled oscillator (VCO) 208 is adjusted in a feedback loop such that the voltage output remains in regulation. The output f_s of VCO 208 is representative of the switching frequency of the power supply, ultimately determining the output voltage provided by the power supply. Additionally, the I_share feedback loop ensures that the currents in Phase 1 and Phase 2 are balanced with respect to each other. The I_share signal, when the power supply is in equilibrium, is representative of the balanced output-current of the power supply, provided by averaging circuit 220 and obtained from the actual values $I_{r1}$ and $I_{r2}$ representative of the Phase 1 current (value) and Phase 2 current (value), respectively.

Duty-cycle (ratio) control circuits 204 and 206 respectively provide the auxiliary switching signals to the output power stages (not shown) of the power supply to balance the phase currents as mentioned above. It should be noted that while the exemplary power supply disclosed herein is a 2-phase power supply, it could generally be an N-phase power supply operating in a similar manner as the power supply shown in FIG. 2, with additional main switching signal(s) provided from digital isolator 202 to control the output voltage, and additional branches (each including a comparator, PI controller, and duty-cycle (ratio) control circuit) providing the additional auxiliary switching signal(s) to balance the output-currents.

Figure 3:
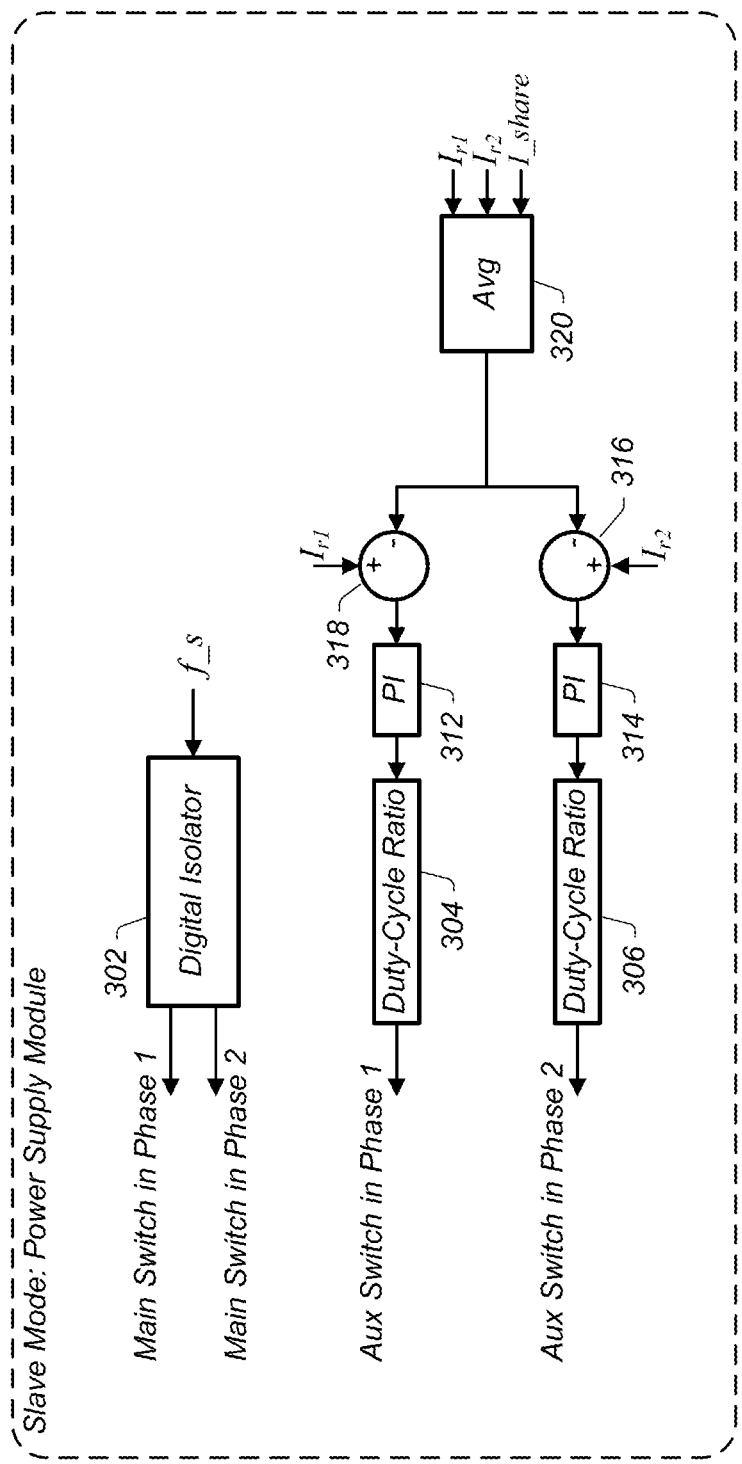
FIG. 3 shows an exemplary system diagram illustrating the operation of a single 2-phase LLC power supply operating in "slave" mode, according to some embodiments.

As illustrated in FIG. 3, the LLC power supply may also operate in a 'slave' mode where it may relinquish its own voltage control loop (i.e. the first control loop shown in FIG. 2) and use the corresponding control loop of the master power supply, which thereby also provides the required operating (switching) frequency, f_s to the slave power supply. As shown in FIG. 3, the components 222, 210, and 208 are not shown to illustrate that those components are not operating in slave mode in the same manner as they operate when the power supply is operating independently, due to the fact that the slave power supply is coupled into the voltage control loop of the master power supply. Furthermore, components similar to those illustrated in FIG. 2 have identical numbering with respect to the corresponding components in FIG. 2, with the exception of the first digit (which is "3" in FIG. 3 whereas it is "2" in FIG. 2) to indicate that the component is part of a slave power supply. In slave mode, for the interphase current-sharing (Phase 1 and Phase 2) of the 2-phase (or N-phase, as indicated above) LLC power supply, averaging circuit 320 may also compare $I_{r1}$ and $I_{r2}$ with an external signal I_share received from another power supply, e.g. from the master power supply, to reference that I_share signal to achieve balanced output-current sharing between its own two (or N) internal phases, as well as the I_share which represents current-output information from the master power supply in order to properly balance the current between all phases present in the overall current-sharing configuration or power-sharing configuration.

Figure 4:
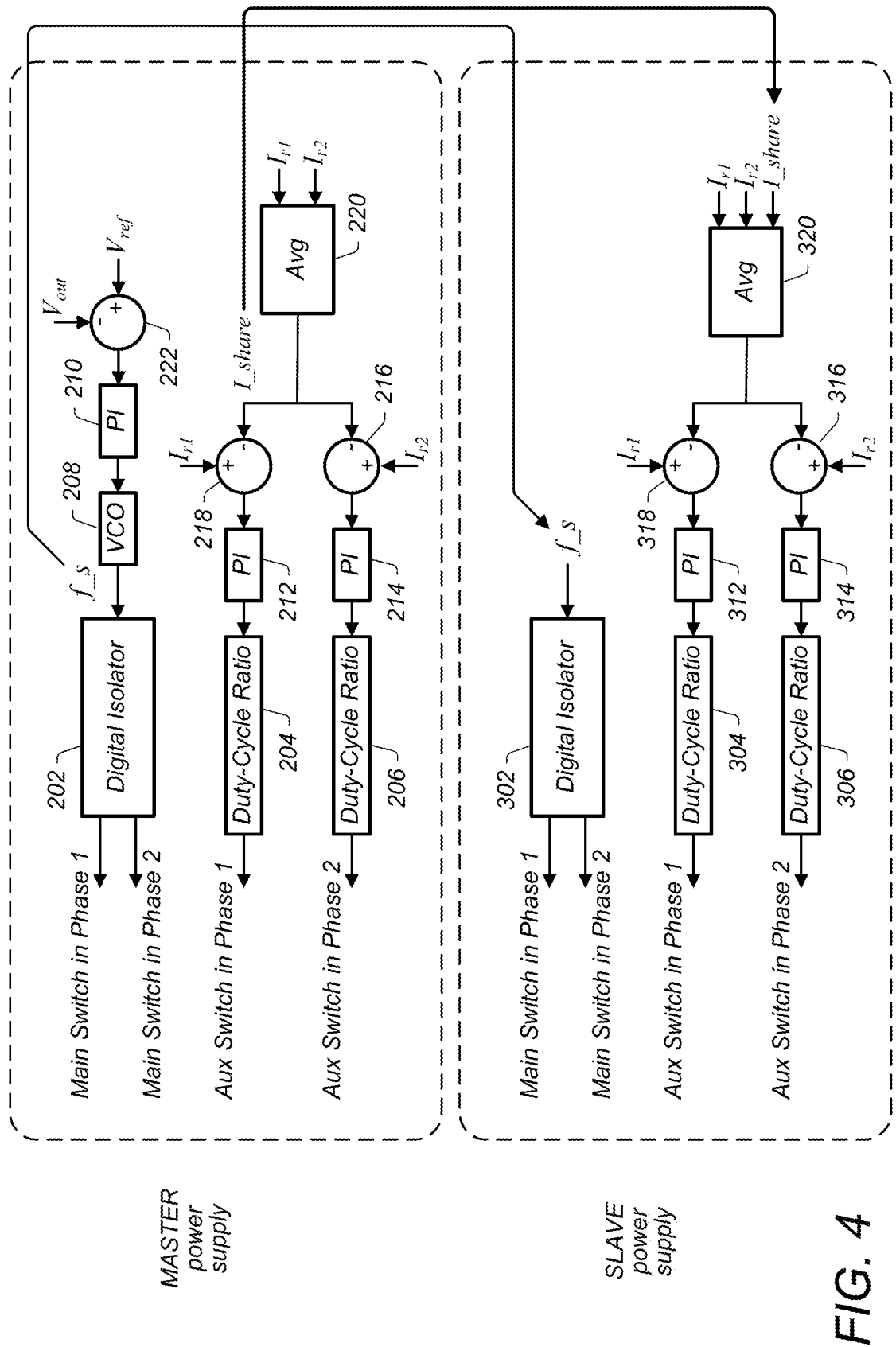
FIG. 4 shows an exemplary system diagram illustrating two power supplies operating in parallel, with one power supply operating as a master and the other power supply operating in "slave" mode (as in FIG. 3), according to some embodiments.

FIG. 4 depicts two multiphase power supplies, e.g. such as the LLC power supply illustrated in FIGS. 2 and 3 operating in parallel, the top power supply operating as a master power supply (as also shown in FIG. 2), and the bottom power supply operating as a slave power supply (as also shown in FIG. 3). As shown in FIG. 4, two signal connections may be established between the master power supply and the slave power supply. The first signal connection is the input of digital isolator 302 to the output of VCO 208, to provide the f_s operating frequency information from the master power supply to the slave power supply. Accordingly, the master power supply may be controlling the slave power supply's output voltage by controlling the slave power supply's operating frequency directly, as shown. The second signal connection is the provision of the I_share signal (value) from the master power supply to the slave power supply. Internally, the slave power supply uses the master power supply's I_share signal to ensure that the slave power supply's total output-current is balanced with the total output-current from the master power supply. That is, for the illustrated single 2-phase LLC master power supply and single 2-phase LLC slave power supply, the slave power supply may use the master power supply's I_share signal to ensure that the total current is balanced between the four phases, namely Phases 1 and 2 of the master power supply and Phases 1 and 2 of the slave power supply.

However, as shown in FIG. 4 (and referring to FIG. 3), when operating in parallel, the slave power supply's voltage control loop is essentially disabled. This presents an issue when the master power supply ceases operation and the f_s signal is lost. In this case the slave power supply might also cease operation or go out of control until its own internal control loop can be enabled and brought back to operation to return the slave power supply to normal operation (in which case it would be operating as a standalone power supply operating independently as illustrated in FIG. 2). This process may be slow due to the saturation of the slave power supply's control loop when operating in slave mode.

Figure 5:
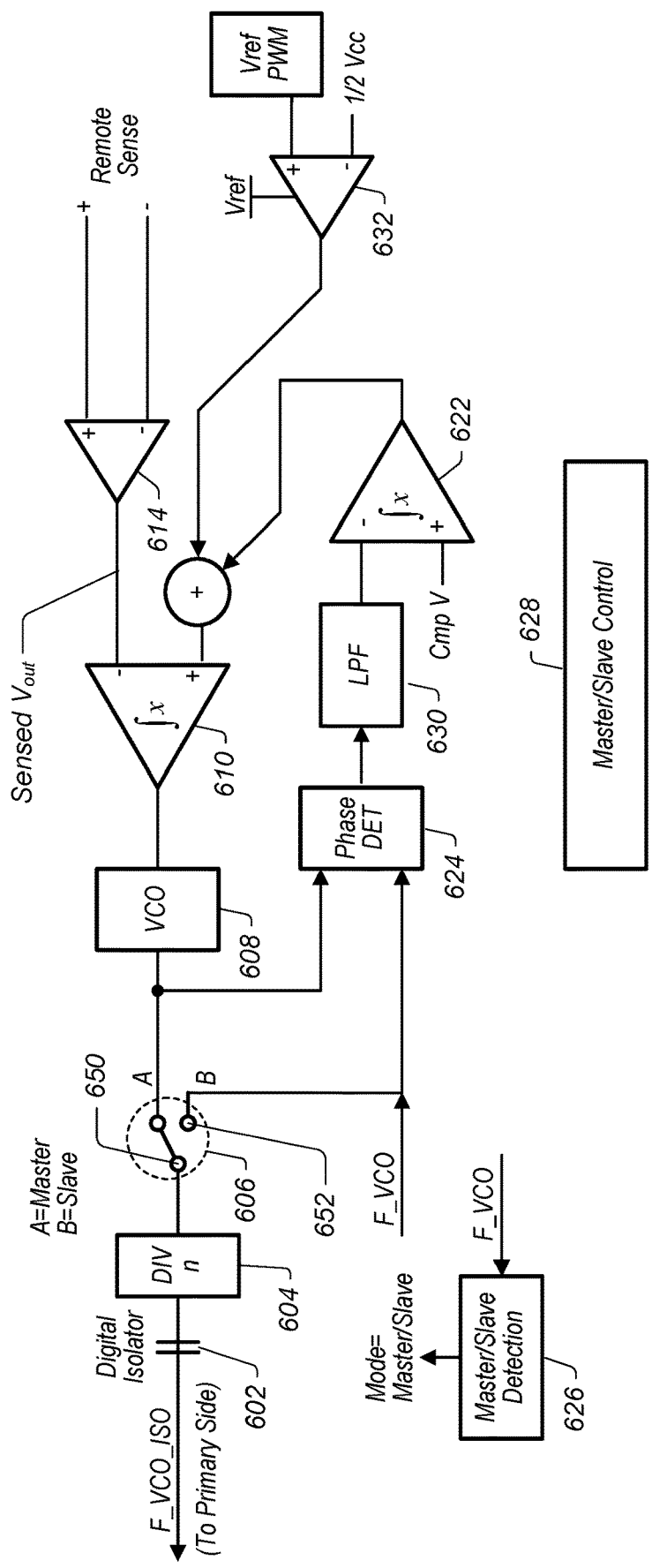
FIG. 5 shows a more detailed view of the control loop mechanism for a single 2-phase LLC power supply, according to some embodiments.

A more detailed view of the voltage control loop mechanism for the illustrated 2-phase LLC power supply is shown in FIG. 5 for a single/standalone/master power supply. It should be noted that FIG. 5 provides a simplified illustration and may therefore include additional components not shown as they may not be essential for understanding the operation of the disclosed control loop mechanism. Furthermore, FIG. 5 is intended to show the functional elements included in the control loop mechanism overall, and various components shown in FIG. 5 may be enabled or disabled based on the mode of operation of the power supply as will be further discussed below with reference to FIGS. 6 through 9. To put it another way, FIG. 5 is intended to show the various components, while subsequent figures will highlight how those components function during various modes of operation of the power supply. It should also be noted that for the sake of simplicity, only a single control signal provided from control node 650 through digital isolator 602 (to primary side) is shown, which represents a control signal to one phase of the power supply. The control signal(s) to other phase(s) may be provided in a manner similar to that shown in FIG. 5.

In the exemplary embodiment shown in FIG. 5, a master/slave detection module 626 may detect whether the power supply is to operate in master or slave mode based on the presence of an external frequency control signal VCO output signal (F_VCO) received at input node 652 from an external source, e.g. from a master power supply. The presence of an F_VCO signal (indicated as f_s in FIGS. 2 through 4) means that the power supply is to operate in slave mode, while the absence of the F_VCO signal means that the power supply is to operate in standalone (single or master) mode. Switch 606 may be set accordingly to engage or disengage portions of the control loop mechanism, in addition to various components being selectively enabled/disabled as required. Sense element (or sensor) 614 is used to obtain a value representative of the output voltage $V_{out}$ of the power supply, and provide a signal representative of that value to a compensator 610 (e.g. a type III compensator). VCO 608, compensator 610, sense element 614 and the internal reference voltage provided from 632 may be considered part of the main VCO control loop. It should be noted that compensator 610, as disclosed herein, may be analog in nature, while alternate embodiments may use a digital variant of the illustrated control loop.

Figure 6:
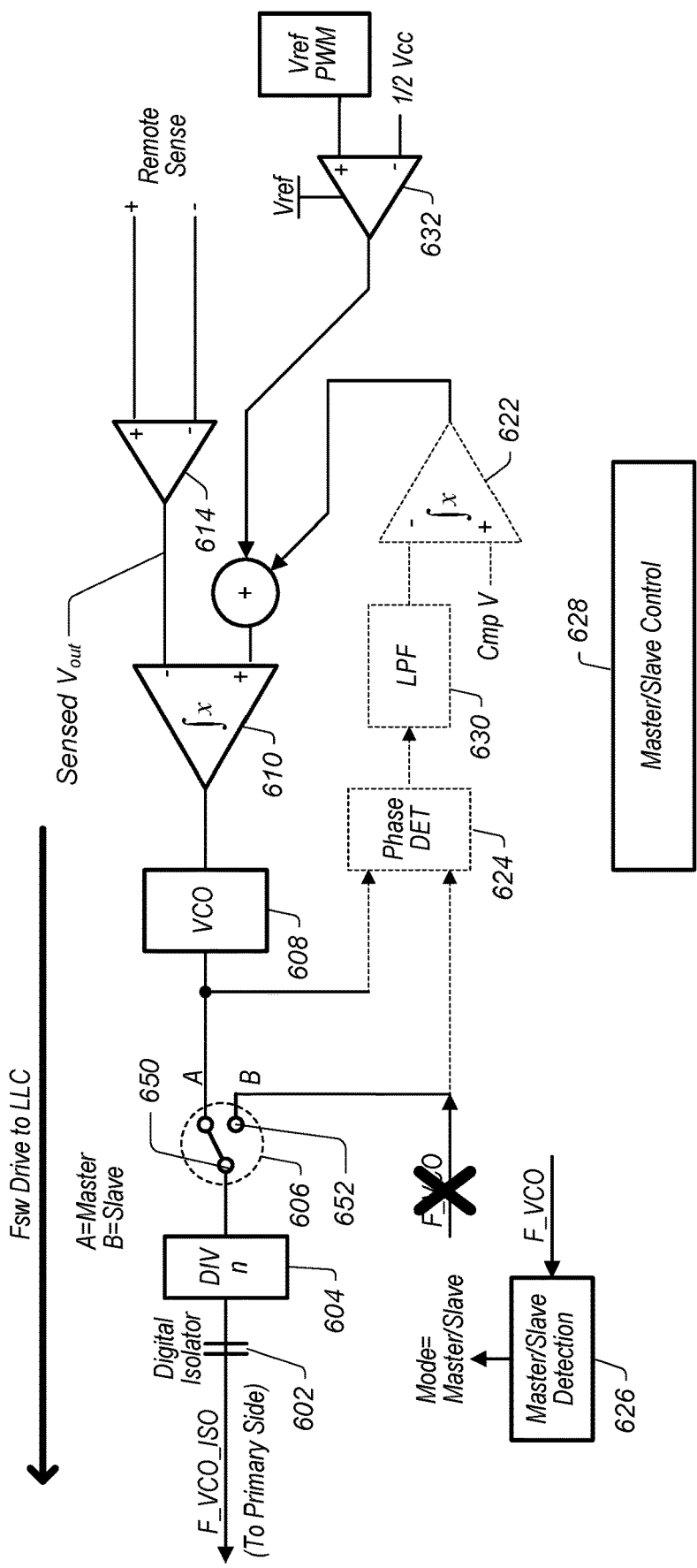
FIG. 6 shows a more detailed view of the control loop mechanism for a single 2-phase LLC power supply operating in master mode, according to some embodiments.

In master operating mode, as shown in FIG. 6, the components illustrated by dashed lines are not used, e.g. they may be switchably/selectively disabled or decoupled from the rest of the components, and the internal control loop that includes components 610, 614, and 634 drives the VCO 608 and sets the operating frequency of the power supply, providing the switching signal through an (optional) frequency divider 604 and digital isolator (e.g. capacitor) 602) as shown. Control module 628 may be used to provide control, e.g. via various switching signals, including the control for switch 606, to enable/disable the various components as required by the given operating mode of the power supply. Detection module 626 and control module 628 may interoperate with other to provide the appropriate control signals within the power supply. In some embodiments, functionality provided by detection module 626 and control module 628 may all be provided by a single module or circuitry.

Figure 7:
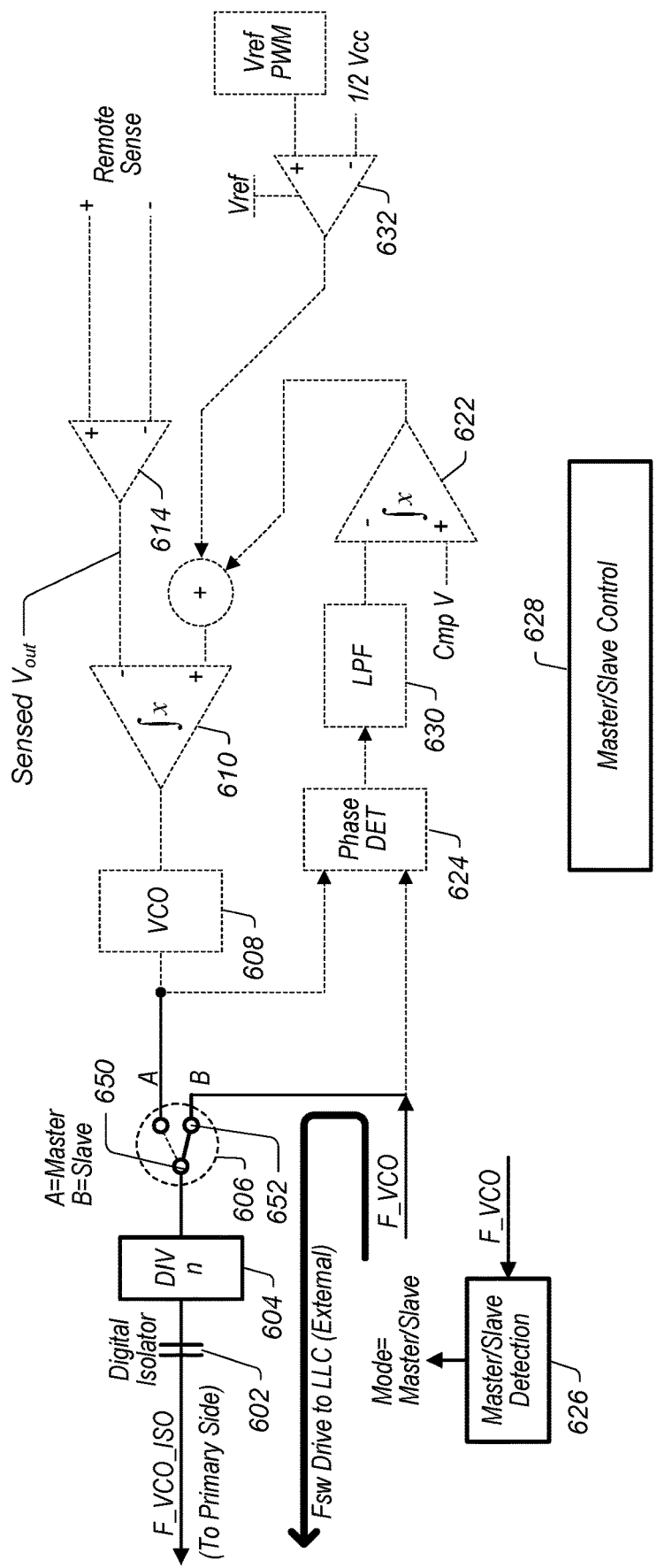
FIG. 7 shows a more detailed view of the control loop mechanism for a single 2-phase LLC power supply operating in slave mode, according to some embodiments.
Figure 8:
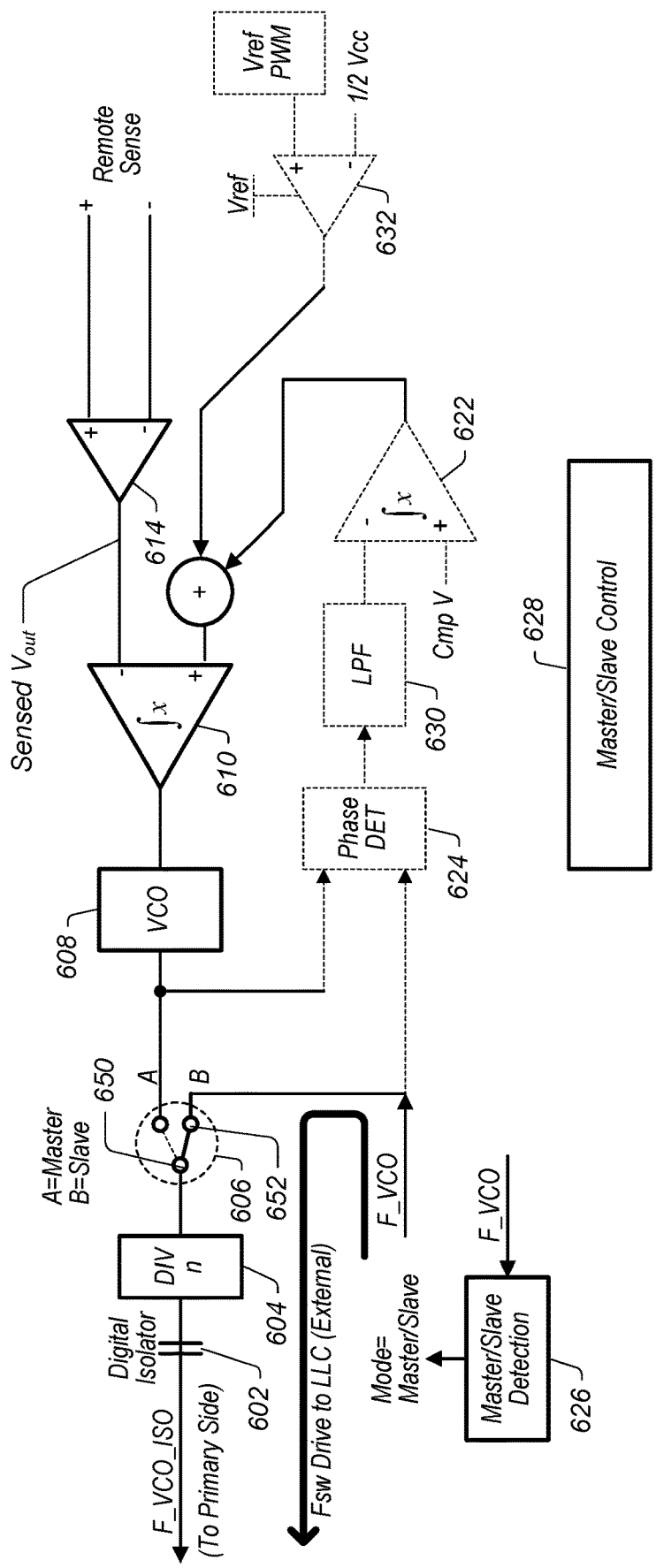
FIG. 8 shows a more detailed view of the control loop mechanism for a single 2-phase LLC power supply operating in slave mode, illustrating the voltage-controlled oscillator and control integrator saturating, according to some embodiments.

In slave operating mode, as shown in FIG. 7, the entire control loop may be disabled (again, disengaged components are shown in dashed lines) and the power supply may be driven by the external F_VCO received from an external (e.g. master) power supply. Because of the control loop being disengaged, in slave mode the VCO 608 and control integrator 610 of the slave power supply is placed in an open loop state which causes it to saturate. This is illustrated in FIG. 8, where components 608, 610 and 614, while functionally disengaged during slave mode operation of the power supply (as indicated in FIG. 7), remain physically coupled to each in an open loop configuration as shown, which results in the saturation of those components. Therefore, those components are indicated in solid instead of dashed lines in FIG. 8, which may be thought of as representing an "expected" or uncorrected slave mode of operation, which would present problems as previously indicated. Therefore, an improved slave mode of operation is desired which would avoid the loop saturation while also allowing a slave power supply to continue operating within operational specifications even if the F_VCO signal is lost, and seamlessly continue operating just the same when the F_VCO signal is restored. Accordingly, a preferred slave mode of operation is illustrated in FIG. 9.

Figure 9:
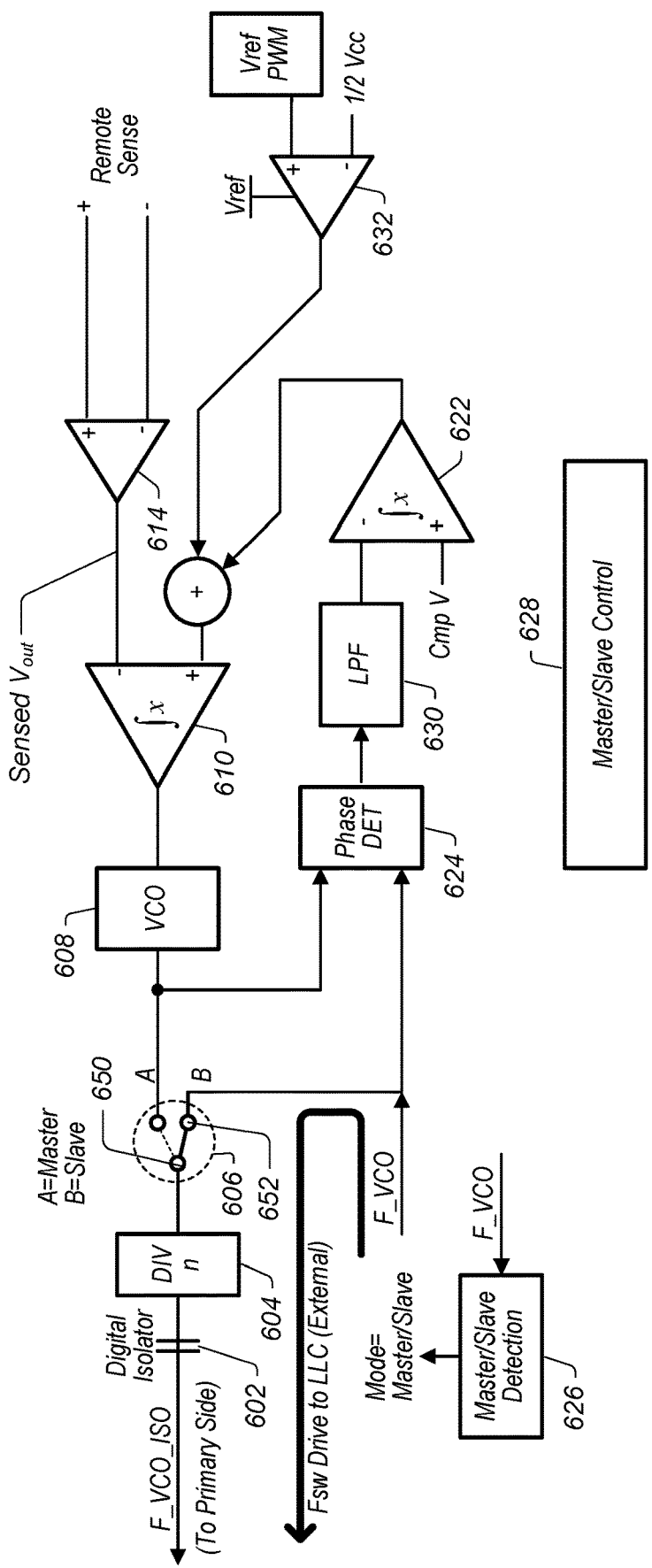
FIG. 9 shows a more detailed view of the control loop mechanism for a single 2-phase LLC power supply operating in slave mode, illustrating detection of the operating frequency of the master power supply and prevention of the saturation of the integrator, according to some embodiments.

In order to prevent the open loop saturation, the slave power supply may be operated to detect the operating frequency of the master power supply and prevent saturation of integrator 610 by keeping integrator 610 in a closed loop at all times during operation as shown in FIG. 9. While the external F_VCO signal is present, e.g. because the master power supply is operating normally and is providing the F_VCO signal to the slave power supply, saturation of the slave power supply's integrator may be prevented by keeping it in a closed loop configuration at all times, even when the slave power supply is controlled by an external VCO signal received from a master power supply. The detection mechanism may include a phase detector 624 which detects the phase difference between the external (master) control signal (F_VCO) and the internal control signal provided by the output of VCO 608 (it should be noted that according to the slave mode of operation illustrated in FIGS. 7 and 8, VCO 608 would be in an open loop state). The output of the phase detector 624 may be filtered, e.g. by a low-pass filter 630, and provided to an integrator 622 whose output may drive the control integrator's 610 input in such a way that in balanced mode the output of VCO 608 tracks the output of the external F_VCO from the master power supply. That is, the detection and tracking mechanism that includes phase detector 624, filter 630 and integrator 622 ensures that the output of VCO 608 matches the F_VCO signal, that is, the control signal provided by VCO 608 essentially represents a replica of the F_VCO signal. Tracking the F_VCO signal in such a manner forces the integrator 610 into a linear mode of operation and facilitates maintaining the output frequency when F_VCO is lost, maintaining the output signal provided through digital isolator 602 at a most recent previous operating frequency corresponding to the F_VCO signal before that signal was lost. When operation of the slave power supply switches back to again being controlled by the external F_VCO signal, e.g. from the master power supply, VCO 608 may simply continue operating in a linear handover without the need to recover from saturation, since it has been maintained at the most recent previous operating frequency. It should be noted that upon detecting the loss of the F_VCO signal, detector 626 operates to put the power supply in a standalone/master mode of operation, providing the output (i.e. the internally generated control signal) from VCO 608 through digital isolator 602, in lieu of looping back F_VCO through digital isolator 602 which occurs during the slave mode of operation.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for controlling a power supply, the method comprising:
    providing, by a first power supply, a first output-current determined at least in part by an output voltage of the first power supply; and
    regulating the output voltage through a control node, said regulating comprising:
        when an external control signal provided by an external source is present at an input node:
            generating an internal control signal based at least on the external control signal; and
            decoupling the internal control signal from the control node and coupling the input node to the control node; and
        when the external control signal is not present at the input node:
            maintaining the internal control signal independently from the external control signal; and
            decoupling the input node from the control node and coupling the internal control signal to the control node.

2. The method of claim 1, wherein the external source is a second power supply.

3. The method of claim 2, further comprising:
    providing, by the second power supply, a second output-current, wherein the first output-current and the second output-current represent respective portions of a total output-current provided by a current sharing configuration that comprises the first power supply and the second power supply.

4. The method of claim 3, further comprising:
    balancing the total output-current to have the first output-current and the second output-current represent equal portions of the total output-current.

5. The method of claim 1, wherein the first power supply is a multiphase power supply, wherein the first output-current comprises two or more portion currents.

6. The method of claim 5, further comprising:
    balancing the first output-current to have the two or more portion currents represent equal portions of the first output-current.

7. The method of claim 1, wherein said generating the internal control signal comprises:
    detecting a phase difference between the external control signal and the internal control signal; and
    causing an operating frequency of the internal control signal to match an operating frequency of the external control signal, using the phase difference.

8. The method of claim 1, further comprising:
    detecting whether the external control signal is present; and
    operating the first power supply as:
        a slave device in response to detecting that the external control signal is present; and
        a master device in response to detecting that the external control signal is not present.

9. A power supply comprising:
    a switching output stage configured to provide an output voltage to source a first output-current; and
    a control circuit coupled to the switching stage and configured to regulate the output voltage through a control node, wherein to regulate the output voltage through the control node the control circuit is configured to:
        when an external control signal provided by an external source is present at an input node:
            generate an internal control signal based at least on the external control signal; and
            decouple the internal control signal from the control node and couple the input node to the control node; and
        when the external control signal is not present at the input node:
            maintain the internal control signal independently from the external control signal; and
            decouple the input node from the control node and couple the internal control signal to the control node.

10. The power supply of claim 9, wherein the external source is a second power supply.

11. The power supply of claim 10, wherein the second power supply provides a second output-current, and wherein the first output-current and the second output-current represent respective portions of a total output-current provided by a current sharing configuration that comprises the first power supply and the second power supply.

12. The power supply of claim 11, wherein the control circuit is further configured to:
    receive a second external control signal from the second power supply; and
    achieve balanced output-current sharing between the first power supply and the second power supply, using the external control signal.

13. The power supply of claim 9, wherein the first power supply is a multiphase power supply, wherein the first output-current comprises two or more portion currents.

14. The power supply of claim 13, wherein the control circuit is further configured to:
    balance the first output-current to have the two or more portion currents represent equal portions of the first output-current.

15. The power supply of claim 9, wherein the control circuit comprises:
    a voltage-controlled oscillator having an output configured to provide the internal control signal;
    a first integrator having a first input, a second input, and an output, the first input configured to be driven by a signal representative of the output voltage, and the output coupled to an input of the voltage controlled oscillator to drive the input of the voltage-controlled oscillator;
    a phase detector coupled to the voltage controlled oscillator to detect a phase difference between the external control signal and the internal control signal; and
    a second integrator coupled to the second input of the first integrator to drive the second input of the first integrator according to the phase difference to cause an operating frequency of the internal control signal to match an operating frequency of the external control signal.

16. The power supply of claim 9, wherein the control circuit is further configured to:
   detect whether the external control signal is present; and
   operate the first power supply as:
      a slave device in response to detecting that the external control signal is present; and
      a master device in response to detecting that the external control signal is not present.

17. A control mechanism for controlling a power supply that supplies an output current determined at least in part by an output voltage of the power supply, the control mechanism comprising:
   an input node configured to receive an external control signal from a source external to the control mechanism;
   a signal processing circuit configured to generate an internal control signal based at least on the external control signal when the external control signal is present at the input node; and
   a control circuit configured to regulate the output voltage through a control node, wherein to regulate the output voltage through the control node the control circuit is configured to:
      decouple the internal control signal from the control node and couple the input node to the control node when the external control signal is present at the input node; and
      when the external control signal is not present at the input node:
         maintain the internal control signal independently from the external control signal; and
         decouple the input node from the control node and couple the internal control signal to the control node.

18. The control mechanism of claim 17, wherein the external source is another power supply.

19. The control mechanism of claim 17, wherein the signal processing circuit is configured to generate the internal control signal by:
   detecting a phase difference between the external control signal and the internal control signal; and
   causing an operating frequency of the internal control signal to match an operating frequency of the external control signal, using the phase difference.

20. The control mechanism of claim 17, wherein the control circuit is further configured to:
   detect whether the external control signal is present; and
   operate the power supply as:
      a slave device in response to detecting that the external control signal is present; and
      a master device in response to detecting that the external control signal is not present.

* * * * *